United States Patent Office 3,039,706
Patented June 19, 1962

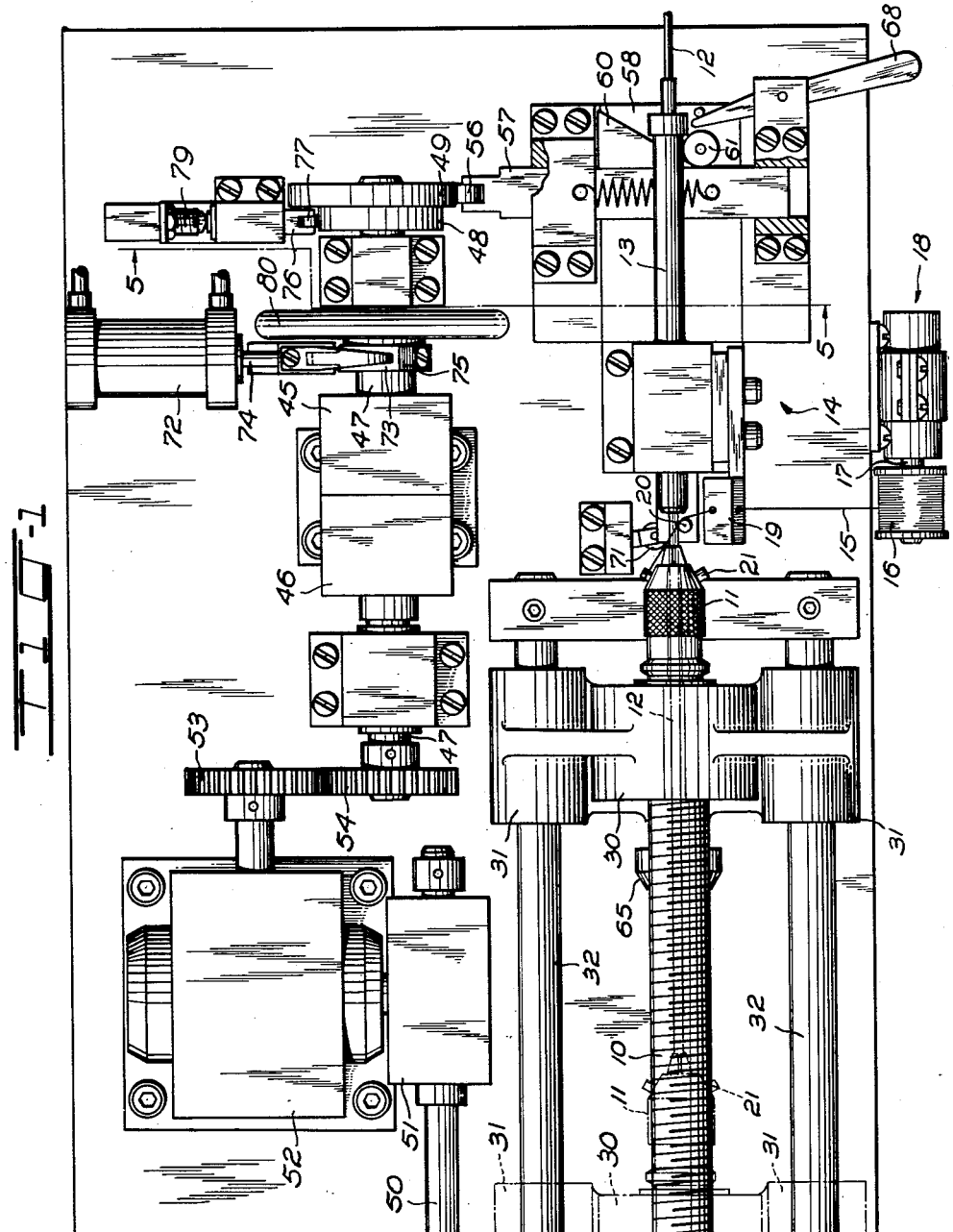

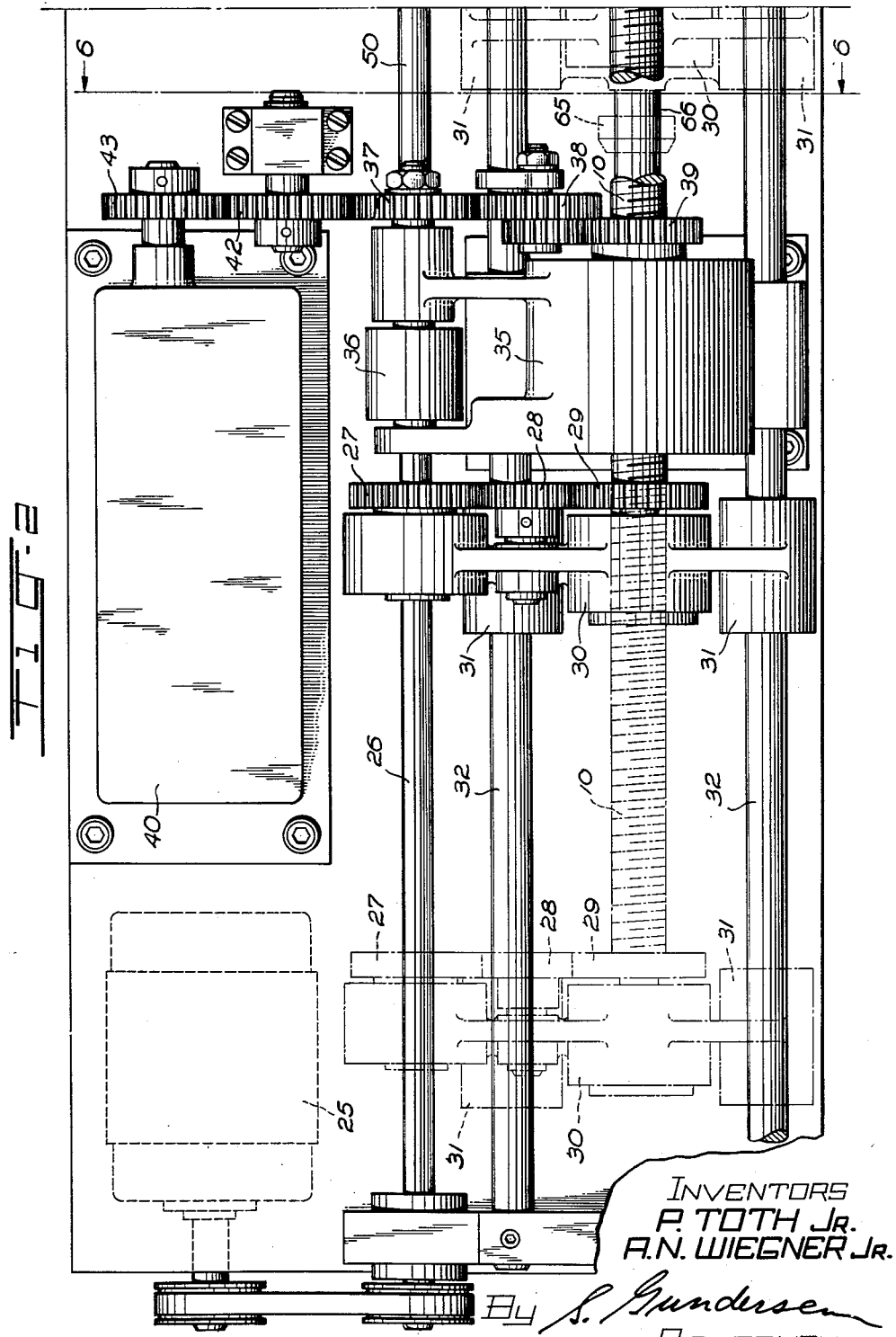

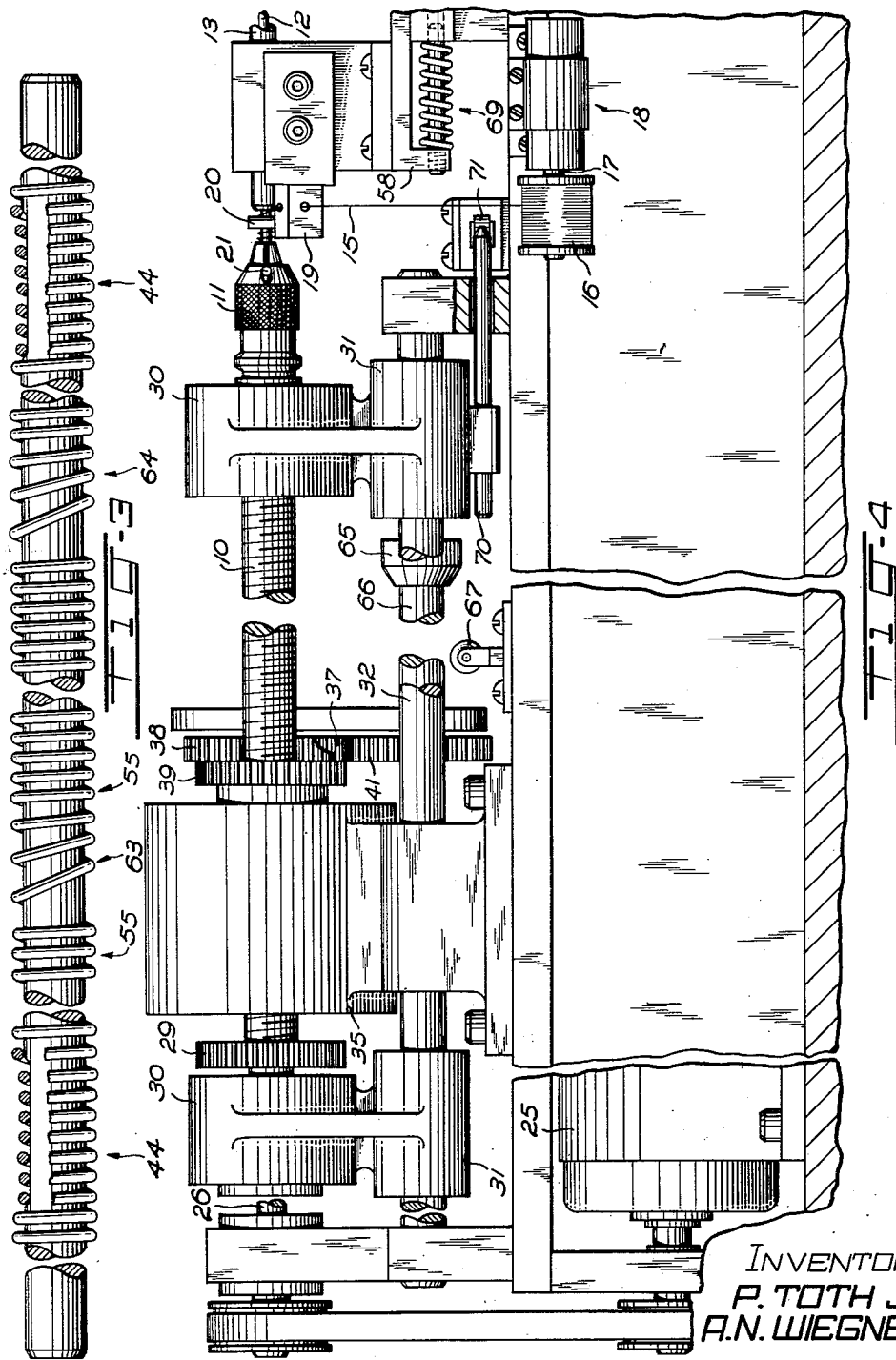

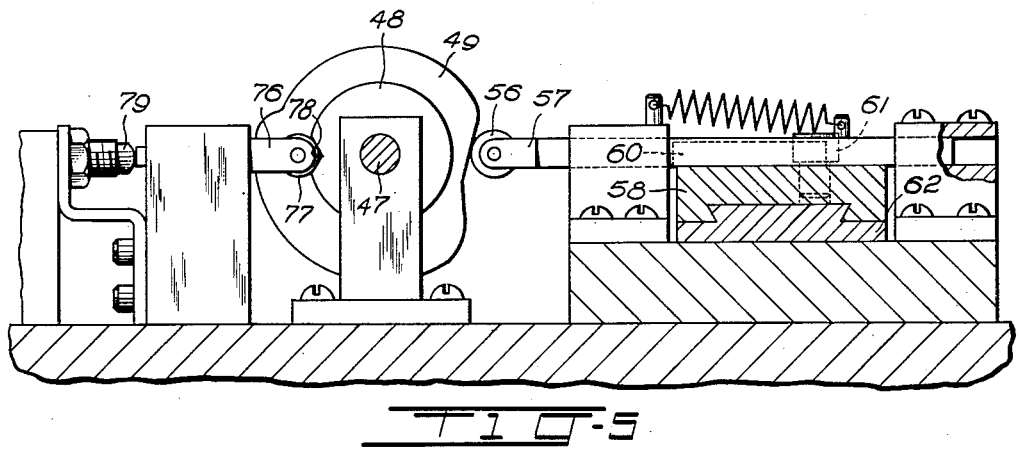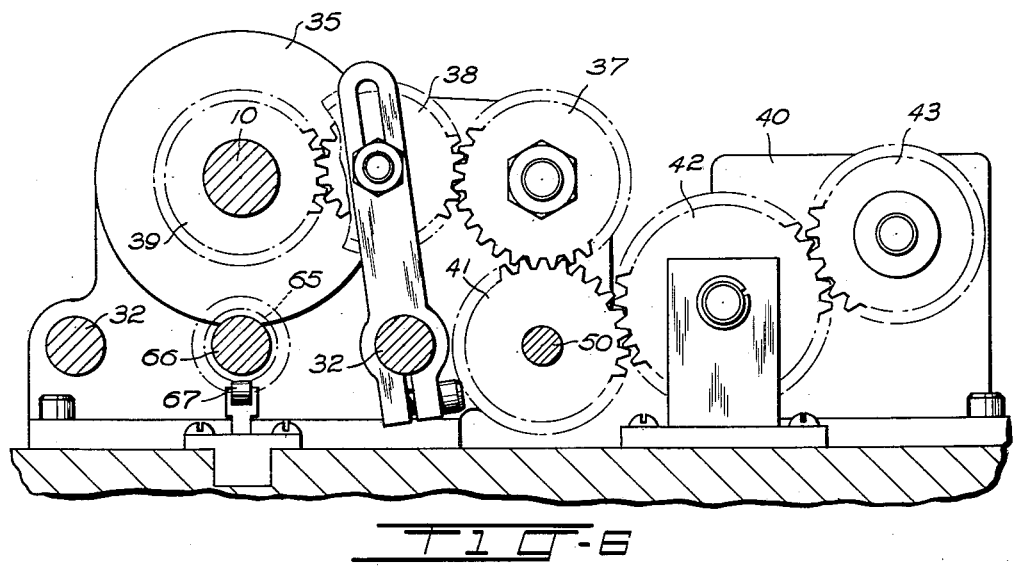

3,039,706
HELIX WINDING MACHINE
Peter Toth, Jr., Bethlehem, and Andrew N. Wiegner, Jr., Allentown, Pa., assignors to Western Electric Company, Incorporated, New York, N.Y., a corporation of New York
Filed Feb. 19, 1960, Ser. No. 9,970
4 Claims. (Cl. 242—9)

This invention relates to coil winding machines and particularly to an improved machine for winding coils or helices of varying pitches, such as the helices utilized in traveling wave tubes.

In the manufacture of traveling wave tubes, the electrical characteristics of the tubes are dependent largely upon the accuracy of the winding of the helix which is extremely critical. The helices of most traveling wave tubes have a series of constant and variable pitches. For example, in one particular code, the helix consists of a predetermined number of turns of three series of constant pitch windings separated by a predetermined number of turns of two series of variable transition pitch windings.

Heretofore, the winding machines utilized required either a manual manipulation of the machine components or a change in the axial movement of the winding core driving means in order to obtain the transition pitch. In either event, there resulted a loss of motion translated to the winding core and consequently a high degree of accuracy could not be obtained in the pitches of the helix.

The object of this invention is a machine capable of winding in a precise manner such compound pitch windings.

In accordance with the general features of this invention, a winding core is rotated and axially advanced by drive means to distribute wire passing from a supply through a wire guide mechanism to the core at a first predetermined pitch. At a predetermined time in the winding, movable means responsive to the drive means moves the guide mechanism with respect to the winding core causing the pitch of the winding to be changed.

In a preferred embodiment, a winding core is driven by a lead screw and wire is distributed thereon at a predetermined constant pitch from a supply through a normally fixed wire guide mechanism. A program monitor responding to the number of turns of the lead screw, activates a cam mechanism for moving the guide in a predetermined relationship to the axially advancing winding core thereby changing the winding to a transition pitch. After the program monitor counts a predetermined number of turns of the transition pitch, the cam mechanism is deactivated and the winding thereafter is made at the initial constant pitch.

Other objects and a fuller understanding of this invention may be had by referring to the following description and claims, taken in conjunction with the accompanying drawings, in which:

FIGS. 1 and 2 disclose a plan view of the machine in the start wind position;

FIG. 3 is a plan view of a wound helix;

FIG. 4 is a front elevational view of the machine in the winding of a helix;

FIG. 5 is a sectional view taken along lines 5—5 of FIG. 1; and

FIG. 6 is a sectional view taken along lines 6—6 of FIG. 2.

With respect to FIGS. 1 and 2, the invention is illustrated as being incorporated in a wire winding machine which consists of a precision lead screw 10, hereinafter called screw, having at one end a chuck 11 for receiving and holding a winding mandrel or core 12. The core is inserted and supported in a tube 13, the tube being a component of a wire guide mechanism generally referred to at 14. Wire 15 is supplied to the core 12 from a reel 16 connected to a shaft 17 of a torsion motor 18. The wire is threaded through a diamond draw die 19, partially looped around guide post 20 and passed over the core 12 onto winding post 21, affixed to chuck 11, where it is secured thereto.

The machine, as seen in FIGS. 1 and 2, is in the starting wind position and core 12 is rotated through screw 10 which is driven by a reversible motor 25, through drive shaft 26 and gears 27, 28 and 29, gear 29 being connected to the other end of the screw. The screw is connected to a pair of lead screw carriers 30 having bearings 31 concentrically disposed to rods 32 over which the carrier traverses axially moving the screw and core to the left simultaneously during the rotation thereof.

The screw rotates at a constant speed inside of a rotating nut (not shown) located in housing 35 which is driven by shaft 26 through an over-running clutch 36 and gears 37, 38 and 39. The rotating nut turns in the same direction as the screw but at a controlled speed less than that of the screw. It is noted that by changing the ratio of the speeds between the screw and nut, different constant pitch helices can be wound.

At the start of the wind cycle, a conventional program monitor 40 is activated through gears 37, 41, 42, and 43 to count a predetermined number of locking turns 44 (FIG. 3) of the wire on the core. After the predetermined number of locking turns have been counted, the program monitor deactivates an electric brake 45 and activates an electric clutch 46 causing cam shaft 47 with cam hub 48 and cam 49 thereon to rotate. The cam shaft is driven from movement imparted to gear 41 (FIG. 6) through shaft 50 which drives helical gears (not shown) located in gear housing 51 (FIG. 1). The helical gears drive a gear reducing unit 52, which in turn, rotates gears 53 and 54 to drive the cam shaft 47. The gear reducing unit 52 is adapted to provide the desired ratio of speed between the screw 10 and cam shaft 47.

Upon the deactivation of brake 45, a predetermined number of constant pitch turns 55 are wound about the core. Simultaneously with the constant pitch winding, cam 49 rotates and moves roller 56 of cam follower 57 extending transversely over slide 58 of the wire guide mechanism 14. The follower 57 remains in a fixed position during the constant pitch winding as roller 56 follows a constant contour of the cam. After a predetermined number of turns are wound, the contour of the cam changes causing the follower to move transversely over the slide 58. A sine bar 60 attached to and extending from one side of the follower 57 wedges between a projecting member 61, preferably a roller, mounted on the slide causing the slide and other components of the wire guide mechanism 14 to move laterally towards the right over slide support 62.

Upon the activation of the wire guide mechanism 14, a different or transition pitch 63 is wound on the core as the screw and core continually move axially towards the left while maintaining their regular wind speed. At the end of the transverse movement of the follower over the slide the lateral travel of the wire guide mechanism stops and the winding of the initial constant pitch 55 is restored due to the fact that the program monitor 40, having counted the required number of turns of the transition pitch 63, activated brake 45 and deactivated clutch 46 causing the rotation of cam 49 to stop. Screw 10 continues its axial movement and winding of the constant pitch 55 as program monitor 40 counts a predetermined number of required turns thereon. After the predetermined number of turns are counted, program monitor 40 deactivates brake 45 and activates clutch 46 causing cam 49 to rotate. A second series of transition pitch windings 64 are made in the same manner as hereinbefore described.

It is to be understood that by changing the contour of the cam, different transition turn spacings are made possible. Further, if a particular helix requires a transition pitch smaller than the constant pitch, the sine bar 60 can be located on the other or left side of the follower 57 and member 61 repositioned accordingly in order to perform the wedge action for movement of the slide to the left, i.e., in the same direction as the axial movement of the screw.

When the required number of transition and constant pitch windings are obtained, additional locking turns 44 (at constant pitch) are wound until an adjustable stop collar 65 (FIG. 4) located on rod 66 connected to screw carrier 31 strikes microswitch 67 to stop the motor. The wound core is removed from the machine by cutting the wire 15 from supply spool 16 and wind post 21. Chuck 11 is opened and the wound core is removed therefrom. Wire guide mechanism 14 is moved to the left and returned to start winding position by actuating handle 68 to release the tension on spring loaded pin 69 connected to slide 58.

Screw 10 is returned to the start wind position upon the activation of the reverse movement of drive motor 25. The motor drives shaft 26 and imparts rotational movement to the screw through gears 27, 28, and 29. The over-running clutch 36 is disengaged causing no further drive movement from that point thereby enabling a rapid movement of the screw through the now stationary rotating nut (not shown) in housing 35 until rod stop 70, connected to the carrier 31, strikes microswitch 71 to stop the motor 25 and right hand movement of the screw.

Simultaneously with the activation of the reverse drive motor 25, brake 45 is released and cam 49 is returned to zero or start wind position upon the activation of air cylinder 72 which moves pawl 73, attached to piston rod 74 to engage a ratchet collar 75 connected on cam shaft 47. As the shaft 47 rotates, a cam follower 76 having a roller 77 follows the contour of cam hub 48 until it drops into detent 78 whereupon follower 75 strikes microswitch 79 causing a circuit (not shown) to close and return pawl 73 and piston rod 74 to their normal inactive position. Hand wheel 80 is provided on cam shaft 47 in the event automatic return of cam zero is not obtained. A new core is inserted in chuck 21 and the machine is ready for another winding cycle.

Thus, although the invention has been described with a certain degree of particularity, it is understood that the present disclosure has been made only by way of example and that numerous changes in the details of construction and the combination of arrangements of parts may be resorted to without departing from the spirit and scope of the invention as hereinafter claimed.

What is claimed is:

1. In a coil winding machine, means for holding a winding core, a wire guide for guiding wire from a supply to the core, drive means for rotating and axially advancing the holding means and core in one direction, the driving means being constant to wind the wire at a predetermined constant pitch, a control device responsive to the movement of the drive means for winding the wire a predetermined number of turns, a slidable element connected to the wire guide, a support for permitting movement of the slidable element parallel to the major axis of the core, a rotatable member on the slidable member, a cam, means responsive to the control device for activating the cam, a cam follower responsive to the movement of the cam and having an inclined edge portion for wedging between the follower and rotatable member causing the slidable element to move with respect to the winding core to change the constant pitch to a second predetermined pitch, brake means responsive to the control device for deactivating the cam after the winding of the second pitch for a predetermined number of turns and thereby restore the winding to the constant pitch, and means responsive to the drive means for stopping the machine after a predetermined number of turns of the constant pitch.

2. In a coil winding machine, means for holding a winding core, a wire guide mechanism in a normally fixed position for guiding the wire from a supply to the core, drive means for rotating and axially advancing the holding means and core to wind the wire at a first pitch, a control device responsive to the movement of the driving means, a first cam, means for driving the first cam, a cam follower responsive to the movement of the first cam and having a linear cam thereon for engaging and moving the guide mechanism a predetermined amount with respect to the winding core and in accordance with the contour of the first cam to change the pitch of the winding, and means responsive to the control device for restoring the winding to the first pitch.

3. In a coil winding machine, means for holding a winding core, a wire guide mechanism in a normally fixed position for guiding the wire from a supply to the core, drive means for rotating and axially advancing the holding means and core to wind the wire at a first pitch, a control device responsive to the movement of the driving means, a first cam, a second cam, means responsive to the control device for driving the first cam to impart linear movement to the second cam to move the guide mechanism a predetermined amount with respect to the winding core and in accordance with the contour of the first cam to change the pitch of the winding, and means responsive to the control device for restoring the winding to the first pitch.

4. In a coil winding machine, means for holding a winding core, a wire guide mechanism in a normally fixed position for guiding wire from a supply to the core, drive means for rotating and axially advancing the holding means and core to wind the wire at a first pitch, a control device responsive to the movement of the driving means, first cam means, second cam means engaging said first cam means and the guiding mechanism, said first cam means being responsive to the control device for moving the second cam means to linearly move the guide mechanism a predetermined amount with respect to the winding core to change the pitch, and means responsive to the control device for restoring the winding to the first pitch.

References Cited in the file of this patent
UNITED STATES PATENTS

| | | |
|---|---|---|
| 1,970,599 | Franke | Aug. 21, 1934 |
| 2,422,827 | Drieschman et al. | June 24, 1947 |
| 2,426,522 | Porter | Aug. 26, 1947 |